May 29, 1945.  E. ZIPPER  2,376,889
BRAKE
Filed May 20, 1940  5 Sheets-Sheet 1

INVENTOR
EMIL ZIPPER
BY Young, Emery & Thompson
ATTYS.

May 29, 1945. E. ZIPPER 2,376,889
BRAKE
Filed May 20, 1940 5 Sheets-Sheet 2
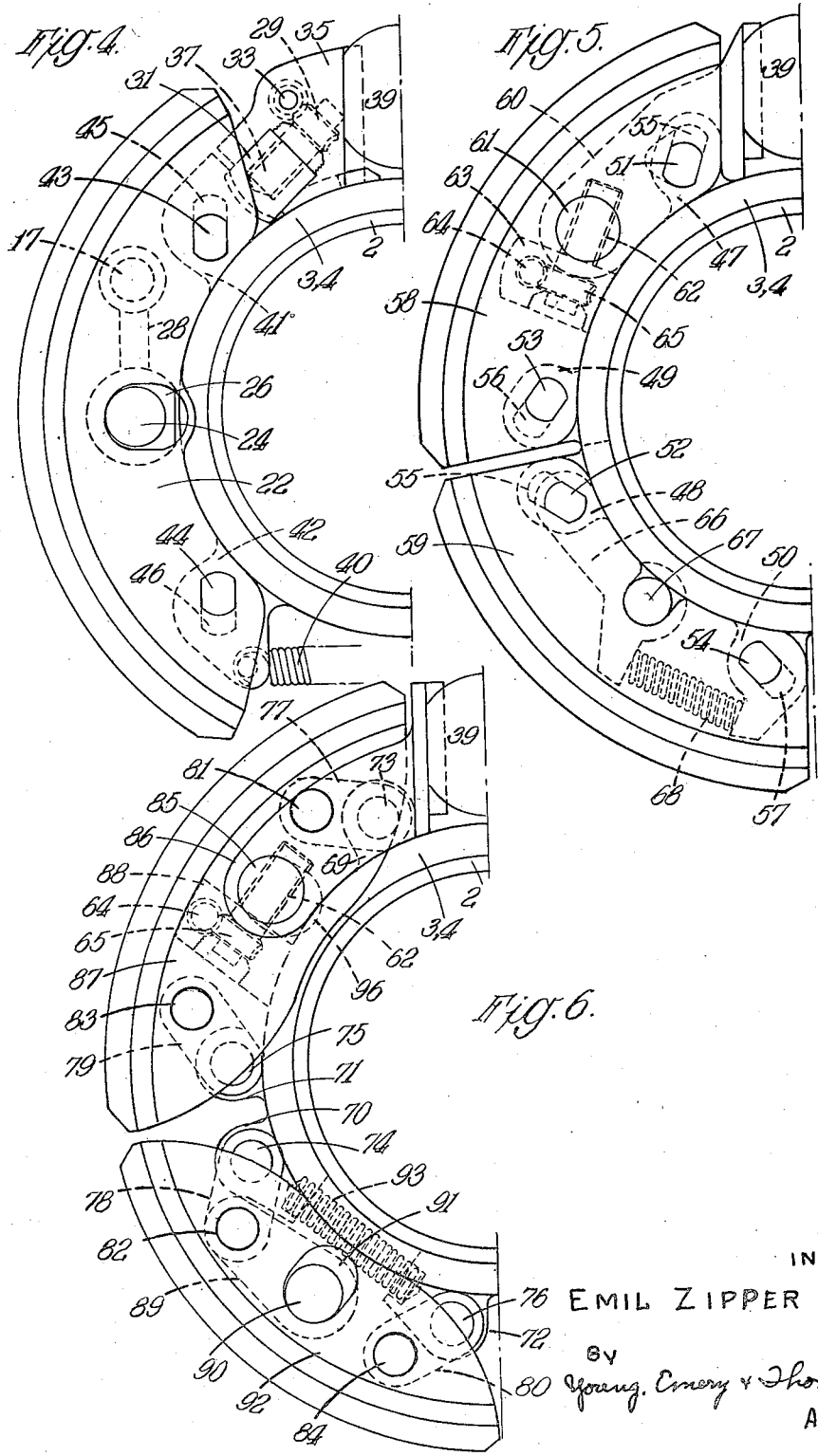
INVENTOR
EMIL ZIPPER
BY
Young, Emery & Thompson
ATTYS.

May 29, 1945.  E. ZIPPER  2,376,889
BRAKE
Filed May 20, 1940  5 Sheets-Sheet 3

Fig. 7.

INVENTOR
EMIL ZIPPER
BY
Young, Emery & Thompson
ATTYS.

May 29, 1945.　　　　E. ZIPPER　　　　2,376,889
BRAKE
Filed May 20, 1940　　　　5 Sheets-Sheet 5
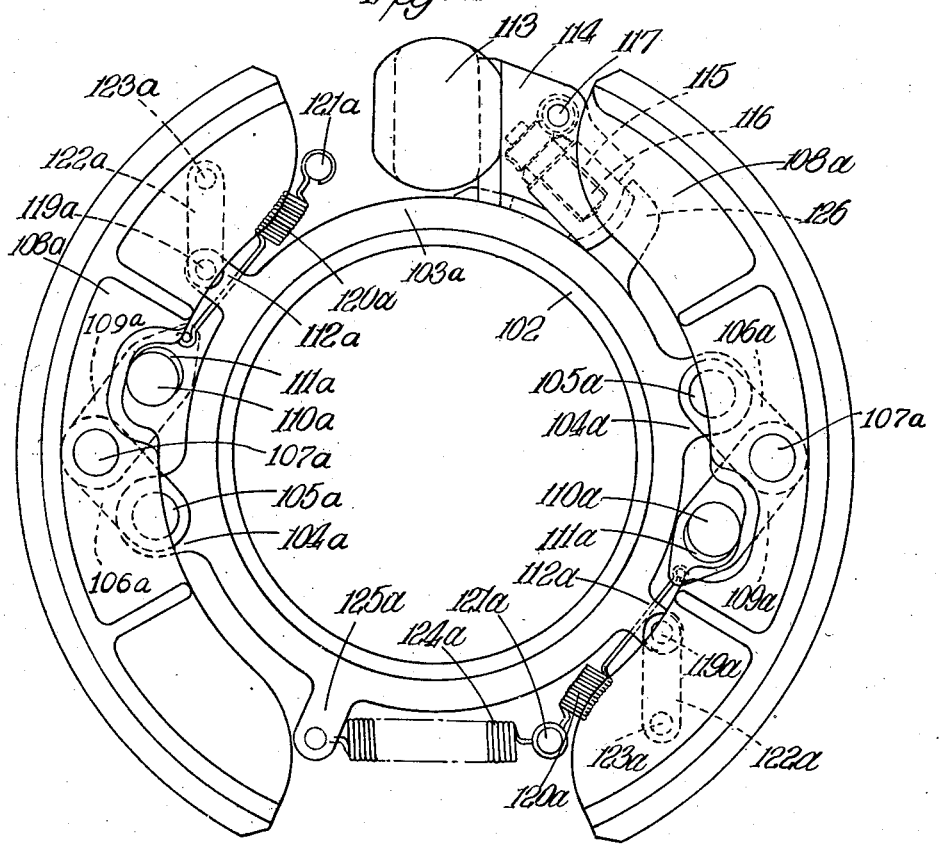

UNITED STATES PATENT OFFICE 2,376,889

BRAKE

Emil Zipper, Paris 16, France; vested in the Alien Property Custodian

Application May 20, 1940, Serial No. 336,290
In Great Britain May 23, 1939

6 Claims. (Cl. 188—78)

This invention relates to brakes and more particularly although not essentially to brakes suitable for road vehicles such as omnibuses and to aeroplanes.

The main objects of the invention are to provide means of simple constructional form for operating brake shoes which will provide efficient servo action and parallel brake motion.

In order that the invention may be more clearly understood, it will now be briefly described with reference to the accompanying drawings, in which:

Figures 4, 5, 6 and 7 are side elevations showing modified constructions of brakes made in accordance with the invention.

Figures 8, 9, 10 and 11 are sectional views on the lines 8—8, 9—9, 10—10 and 11—11 in Figure 7, and Figure 12 is a side elevational view of a modified form of brake made in accordance with the invention.

Figure 1:
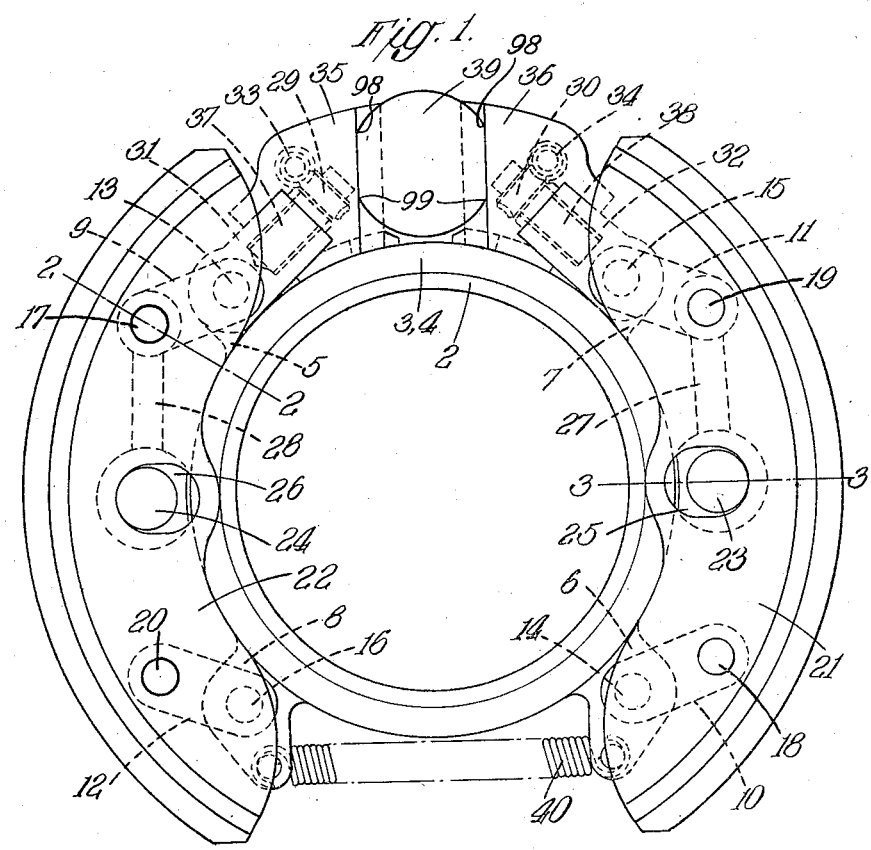
Figure 1 is a side elevational view of a brake made in accordance with the invention.
Figure 2:
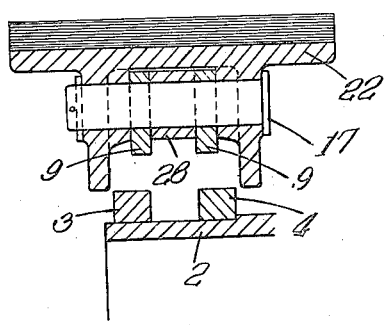
Figure 2 is a sectional view on the line 2—2 in Figure 1.
Figure 3:
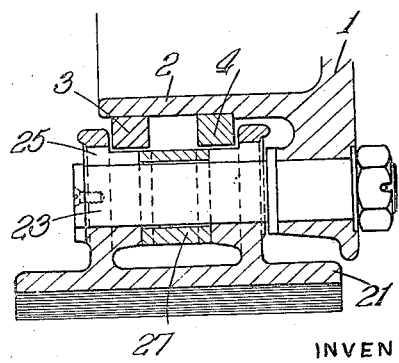
Figure 3 is a section on the line 3—3 in Figure 1.
Figure 8:
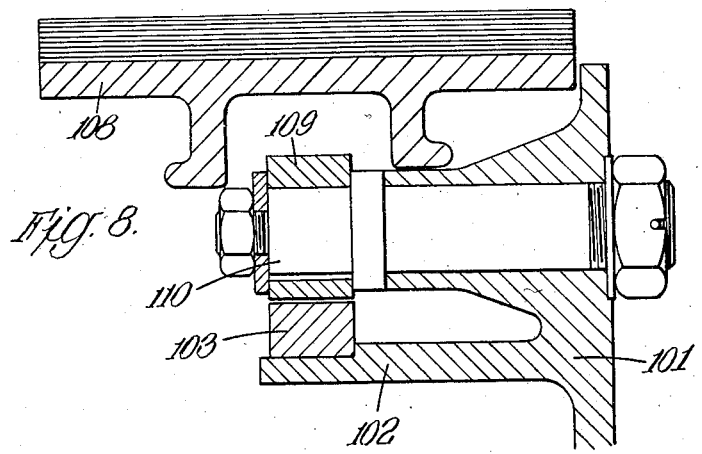
Figure 9:
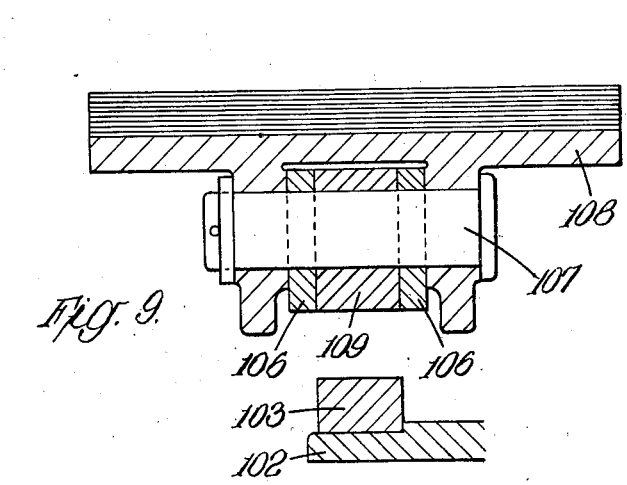
Figure 10:
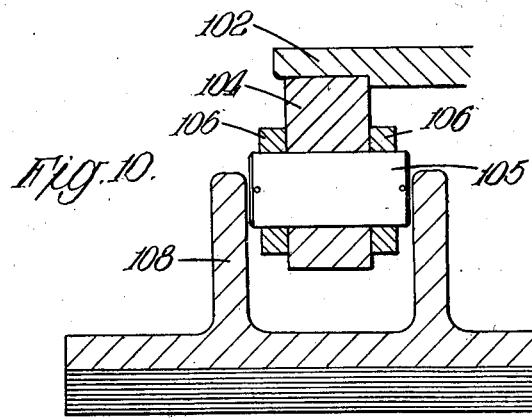

In Figures 1, 2 and 3:

The brake carrier 1 which is fixed to the axle casing has an annular flange 2 on which two axially spaced guiding rings 3 and 4 are rotatably mounted. Each of these two guiding rings has two lugs 5, 6 and 7, 8 which are 180° apart. Corresponding pivot pins 13, 14 and 15, 16 are arranged rotatably in holes in these lugs. Corresponding levers 9, 10 and 11, 12 are connected at one end to these pivot pins. In each of the brake shoes 21, 22 are two holes located adjacent their ends, in which corresponding pivot pins 17, 18 and 19, 20 have their bearings. The remaining ends of the levers 9, 10, 11, 12, are connected to the last mentioned pivot pins. Slots 25 and 26, are provided in the middle of the brake shoes 21 and 22, respectively, through which pass pins 23 and 24, respectively, that are fixed in the brake carrier 1. Levers 27 and 28 have their opposite ends pivoted on the pins 23 and 24 and the bolts 19 and 17, respectively.

On each of the pins 13 and 15 is pivoted a corresponding guiding piece 31, 32, which can slide tangentially in corresponding cam blocks 35, 36. The sliding movement serves for the adjustment of the brake shoes and is carried out by worms 33, 34 and worm wheels 29, 30. The worm wheels 29, 30, are fixed to bolts 37, 38, having their nuts in the connecting blocks 31, 32. The cam blocks 35, 36 are mounted on the rings 3 and 4 in a manner to permit some circumferential movement but prevent any radial movement of the blocks relative to the rings. By turning the cam 39 out of the position shown in Fig. 1, the blocks 35, 36 are moved apart. The distances of the points 98 and 99 from the cam centre are equal in order to equalise the movement of the cam blocks. Return of the two rings and the brake shoes to initial positions is effected by means of the contractile spring 40.

In the construction illustrated in Figure 4, the lugs 41, 42 of the guiding rings 3, 4, have slots 45, 46 in which flat sided pins 43, 44 can slide. These pins are mounted in the brake shoes 21, 22.

Figure 5 shows the same slotted arrangement applied to a four-shoe brake. Each of the rings 3, 4 has four lugs 47, 48, 49, 50. In the lugs are slots 55, 56, 57, in which the flat sided pins of the brake shoes can slide. The pins 67 are fixed in the brake carrier. The levers 66 are mounted on the pins 67 and on the flat sided pins 52. The cam block 60 has slotted extensions reaching to the middle of the brake shoe. At the ends of these extensions are holes in which the socket 61 is borne. In the socket is a thread for the screw 62. A worm wheel 65 is connected with the screw 62 which is carried by a lug 63 on the rings 3, 4. The adjustment is effected by means of the worm 64. The return movement of the brake shoes to their normal positions is effected by means of springs 68.

In the four-shoe brake shown in Figure 6, the lugs 69, 70, 71, 72 which are part of the guiding rings 3, 4, have holes in which the pins 73, 74, 75, 76, are rotatably mounted. In each of the brake shoes 87, 92 are two holes in which the pins 81, 82, 83, 84 are carried. Corresponding ends of the levers 77, 78, 79, 80 are mounted on the pins 73, 74, 75, 76 and on the pins 81, 82, 83, 84, the pins being rotatable in the levers. The pin 90 which is fixed in the brake carrier 1 passes through the slot 91 of the brake shoe 92. Corresponding ends of the lever 89 are mounted on the pins 82 and 90.

The rings may be mounted on roller or needle bearings.

In Figure 7, a ring 103 turning on a stationary circular flange 102 fixed on the brake housing 101 has lugs 104 connected by pins 105 and links 106 to the pivot pins 107 carried by the brake shoes 108. The pivot pins 107 are connected by links 109 to the fixed pins 110, the apertures in the links adjacent to the fixed pins being elongated as shown at 111. The links 109 are pulled by springs 112. The arrangement 113, 114 applies power to the ring and the spacing between the part 114 and the lug 104 can be adjusted by the arrangement 115, 116, 117. The shoes are connected to each other by guides 119 sliding in guideways 120.

In the constructional form of the invention shown in Figure 12, a single ring 103a is provided. This ring has two radially extending lugs 104a carrying pivot pins 105a offset 180° from each other and disposed a short distance one on one side and one on the other side of a line connecting the middle points of two brake shoes 108a. The pins 105a are connected by links 106a each to a pivot pin 107a carried by the brake shoe midway between its ends. These pivot pins are linked by links 109a to pins 110a carried by a fixed part. The apertures in these links engaged by the fixed pins 110a are slightly elongated as at 111a. The two pairs of links form toggles, each pair being opened to about 90° or a little more. A short rotary movement applied to the ring in one direction tends to collapse the toggles and force the shoes outwardly. The trailing end of each shoe is connected at 123a by a link 122a at 119a to a radially outwardly projecting lug 112a on the ring 103a, whereby a parallel action of the shoes is ensured. A spring 124a pulls on a lug 125a for returning the ring to its normal position. Other springs 120a pull on the ends of the toggle links 109a adjacent to the fixed pins 110a so that the elongated apertures 111a are drawn towards the trailing ends of the shoes. When the brake is applied, the braking force will tend to move the shoe in the direction of rotation of the brake drum, thereby increasing the pressure of the shoes through the leverage of the toggle links and of the links at the trailing ends of the shoes. The elongated apertures 111a permit any slight movement of the shoes necessary for this purpose. A powerful servo action is thus exerted on both shoes.

I claim:

1. A brake apparatus comprising brake shoes, a rotatably mounted ring having two outwardly extending lugs offset 180° from each other and disposed a short distance one on one side and one on the other side of a line connecting the middle points of two brake shoes, a toggle linkage having one link connecting one lug to the mid-point of one brake shoe, another toggle linkage having one link connecting the other lug to the mid-point of the other brake shoe, fixed pins, the other links of the toggle linkages connecting said pins to the mid-point of the shoes and means to move the ring whereby the shoes are actuated to apply the braking force through the toggle linkages.

2. A brake mechanism comprising a fixed support, a plurality of brake shoes mounted circumferentially about the center of said support and adapted to be moved outwardly into engagement with a drum of a rotary member to be braked to produce a braking effect, links, means pivotally connecting one end of each link to the support, means pivotally connecting the other end of each link to one of the shoes, an actuator member carrying pins movable in a circle about the center of said support, other links each having one end connected to said pins and its other end connected to the shoes by the means connecting the first-mentioned links to the shoes, the points of connection of the links to the actuator member and support being inwardly of the points of connection of the links to the shoes and the point of connection of a pair of links with a shoe lying intermediate the points of connection of said pair of links with the actuator and support to produce a servo braking effect in one direction of rotation of the member to be braked, the means connecting the links to the support including lost motion mechanism to enable slight rotation of the shoe with the member to be braked when rotating in the opposite direction to produce a servo effect.

3. A brake mechanism comprising a fixed support, a plurality of brake shoes mounted circumferentially about the center of said support and adapted to be moved outwardly into engagement with a drum of a rotary member to be braked to produce a braking effect, a pin carried by each shoe, a pair of links each having one end pivotally connected to said pin, a pin connecting the other end of one link to the support, a rotary actuator, and a pin connecting the other end of the other link to the actuator pin, the pin of the shoe lying outwardly of and between the pins of the support and actuator, the end of the links connected to the support pins having slots receiving said support pins to provide a lost motion connection therewith.

4. A brake mechanism comprising a fixed support, a plurality of brake shoes mounted circumferentially about the center of said support and adapted to be moved outwardly into engagement with a drum of a rotary member to be braked to produce a braking effect, a pin carried by each shoe, a pair of links each having one end pivotally connected to said pin, a pin connecting the other end of one link to the support, a rotary actuator, a pin connecting the other end of the other link to the actuator pin, the pin of the shoe lying outwardly of and between the pins of the support and actuator, the end of the links connected to the support pins having slots receiving said support pins to provide a lost motion connection therewith, and a spring urging the link containing the slot to its innermost position.

5. A brake mechanism comprising a fixed plate having a substantially cylindrical lateral extension, a plurality of brake shoes positioned around said extension for engagement with a brake drum substantially concentric with said extension, pin and slot means pivotally and slidably mounting the brake shoes on said plate for pivoting on the plate and for outward movement toward the brake drum and for limited circumferential movement in the direction of rotation of the drum from an inward retracted position, said pin and slot means being positioned adjacent to the middle of the brake shoes, guide rings rotatably mounted on said extension, expanding means mounted on said plate between two of the brake shoes, pivot means operatively connecting the two brake shoes at points at one side of said pin and slot means with corresponding ones of the guide rings and with the corresponding sides of said expanding means, lever means operatively connecting the said two brake shoes with adjacent portions of the said corresponding rings at points at the opposite side of said pin and slot means, and spring means operatively connected between the ends of the two brake shoes opposite said expanding means for retracting the brake shoes toward initial position upon contraction of said expanding means.

6. A brake mechanism according to claim 5 wherein toggle link means is operatively connected between said pivot means and the pin of said pin and slot means, said toggle link means, said pin and slot means, and said lever means being proportioned to permit the brake shoes to move in a substantially radially outward direction and toward the direction of rotation of the brake drum when said expanding means is expanded and the fore end of at least one of the brake shoes engages the drum, whereby a servo action of the brake shoes is produced.

EMIL ZIPPER.